Nov. 30, 1937.  J. E. SPECHT  2,100,460
ELECTRIC GAUGE AND METHOD FOR CONTROLLING THE CURRENT
OUT PUT OF GRID CONTROLLED GLOW DISCHARGE TUBES
Filed Jan. 14, 1935
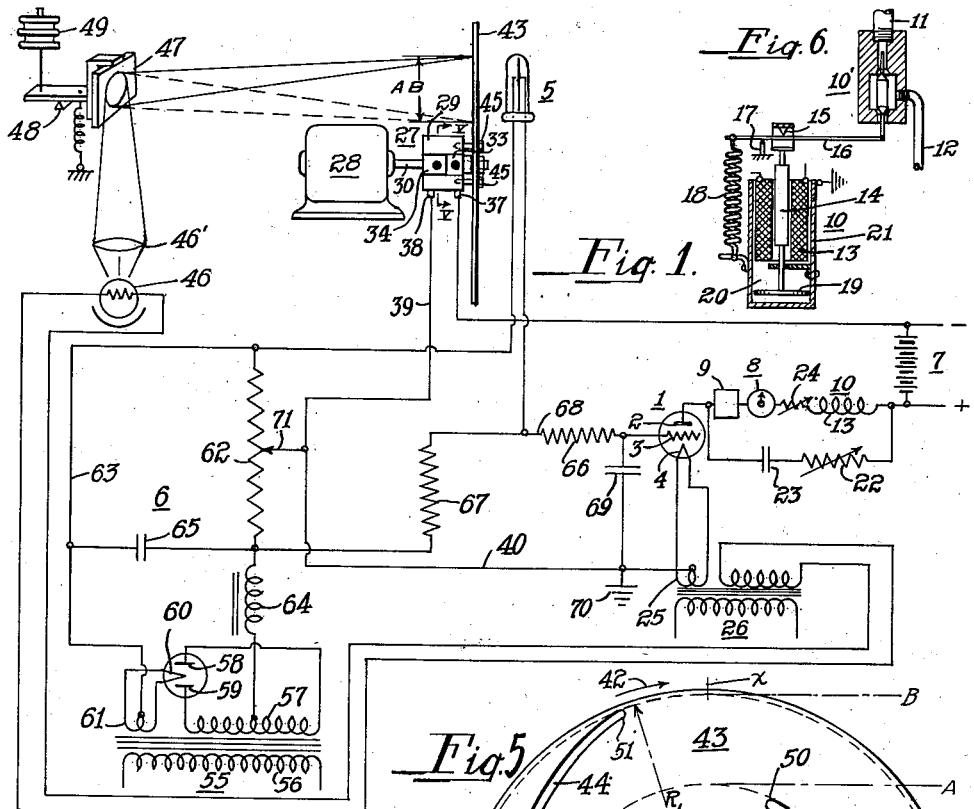
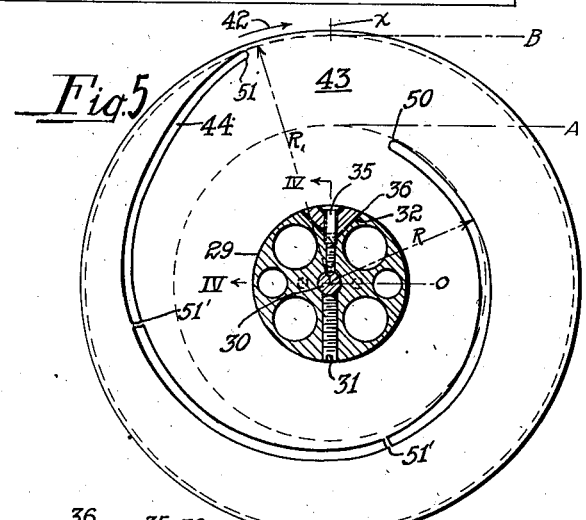
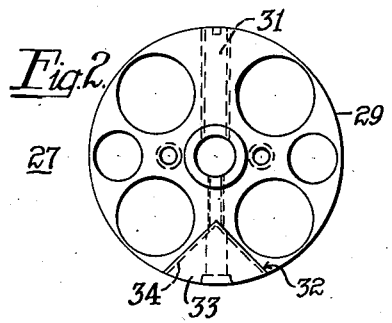
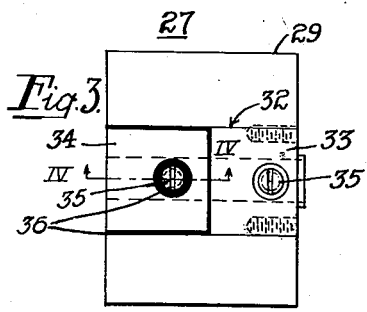
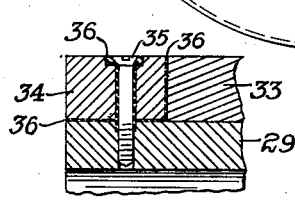
INVENTOR
James E. Specht
By Green & McCallister
His Attorneys Patented Nov. 30, 1937

2,100,460

UNITED STATES PATENT OFFICE 2,100,460

ELECTRIC GAUGE AND METHOD FOR CONTROLLING THE CURRENT OUTPUT OF GRID CONTROLLED GLOW DISCHARGE TUBES

James E. Specht, Orrville, Ohio, assignor to John M. Hopwood, Dormont, Pa.

Application January 14, 1935, Serial No. 1,589

12 Claims. (Cl. 250—41.5)

This invention relates to electrical gauges adapted to measure, record, and/or regulate variables such as temperature, pressure, deflections, etc., and more particularly to electrical gauges employing grid controlled glow discharge devices.

In United States Patent No. 2,049,669 granted Aug. 4, 1936 on a copending application of George W. Smith and James E. Specht, Serial No. 704,518, filed December 29, 1933 and assigned to John M. Hopwood which became Patent No. 2,049,669 on August 4, 1936, electrical gauges of the character referred to generally above, are disclosed which embody grid glow tubes or grid controlled glow discharge devices having alternating current voltage applied to plate circuits thereof, and means for causing the glow tubes to pass current in accordance with the magnitude of a variable to be measured and/or controlled, or in accordance with a characteristic of the variable, and for utilizing the current output to operate control or regulating apparatus. By passing the current output of these tubes through an instrument or meter suitably calibrated, the instantaneous value of the variable may be indicated directly, the changes in the variable recorded, or both. In that application, a photo-electric cell, a beam of light, which is focused to impinge on the cell, and oscillated in accordance with the magnitude of or changes in magnitude of the variable, and a rotating slotted screen or disc disposed in the path of the light beam, are employed to control the length of time during the positive half cycles of the plate circuit voltage that current flows in the plate circuit of the glow discharge device.

The disc of this copending application is driven by a synchronous motor and the slots therein are so spaced in electrical degrees, that a slot is always sweeping across the path of travel of the light beam during periods that the positive half cycles of the alternating current voltages are applied to the plate circuit of the glow discharge device. The slots of the disc or screen are so shaped that for each position of the light beam, the grid of the glow tube will be energized to cause the tube to pass current at a definite but different time in the positive half cycles of the plate circuit voltage. By giving these slots the proper shape, the output current can be made to bear a linear relation to the variable under consideration or to vary in accordance with any predetermined exponential function of the variable.

An object of this invention is the provision of a gauge in which an oscillating light beam, rotating screen or disc, and a photoelectric cell may be utilized to control the operation of a glow discharge device but in which the periodicity of the positive voltage applied to the plate circuit of the glow tube will be permanently synchronized with the movement of the slot in the rotating screen or disc, in which there will be no phase-lag between the screen and the plate circuit voltage; and in which relatively wide changes in the periodicity will not objectionably impair the accuracy of the gauge.

A more specific object of the invention is to provide a gauge of the character referred to above, having means for supplying the plate circuit of the glow discharge device with interrupted direct current voltage and for causing the slot in the rotating disc to be synchronized with the periods during which the plate voltage is applied.

A further object of the invention is to cause the glow discharge device to pass current for such lengths of time during the "on" periods of the plate circuit voltage that the current output of the device will correspond in magnitude to the variable to be measured and/or controlled and/or regulated.

Other objects of the invention will, in part, be apparent and will, in part, be obvious from the following description taken in conjunction with the accompanying drawing, in which:

Figure 1 is a more or less diagrammatic view of circuits and apparatus arranged in accordance with a form of the invention;

Figs. 2 and 3 are enlarged end and bottom plan views respectively, of a device for supplying interrupted direct current voltage to the plate circuit of the glow discharge device embodied in the circuit of Fig. 1;

Fig. 4 is a fragmentary view in section of the device of Fig. 3 taken on lines IV—IV of Figs. 3 and 4;

Fig. 5 is an enlarged view in section of the device of Fig. 3 taken on line V—V of Fig. 1 showing the device and a slotted rotating screen or disc mounted in operative relationship; and Fig. 6 is a view in section of a current responsive control member adapted for use in the plate circuit of the glow discharge device.

Throughout the drawing and the specification, like reference characters indicate like parts.

In Fig. 1 of the drawing, an electrical gauge embodying what now appears to be a preferred form of the invention, is illustrated. This gauge includes a glow discharge device 1 having a plate or anode 2, a grid 3, and a cathode or filament 4, a light sensitive electrical device 5, such as a photoelectric cell, and means 6 for supplying direct current voltage for operating the photoelectric cell and the grid of device 1. The plate circuit of the glow discharge device is supplied with direct current from any suitable source which for convenience, has been indicated as comprising a battery 7.

The system is so arranged that the plate circuit current of the glow discharge device may be varied in accordance with, or to bear any desired or arbitrary relationship to the variable to be measured and/or regulated. Thus, the average value of the current would indicate the instantaneous value of the variable. To determine what these average values are, a meter 8 suitably calibrated in terms of the variable may be connected in the plate circuit, and if desired, a recording meter 9 may be connected in this circuit also, as disclosed in the copending application previously referred to herein.

Since the glow discharge device will continue to pass current, once it has been started, until the positive plate circuit voltage is reduced to zero or has been interrupted, the current output may be controlled by controlling the time in the period or periods that plate voltage is applied, that a break-down bias voltage is applied to the grid circuit. Thus the device may be controlled to pass current for the full period that the positive plate voltage is applied or for any fractional part of such period. The manner in which the output current of the glow discharge device is controlled will be more fully set forth hereinafter.

In case it is desired to utilize the gauge as a regulating device, in addition to its indicating and recording function, a current responsive device 10 may be connected in the plate circuit and utilized to operate a regulating member or actuating device, for instance an escapement valve 10'. This valve would control the transmission of variable pressure impulses from a pipe line 11 having compressed air therein at constant pressure to a sending line 12. Line 12 would in turn be connected to a device which controls the operation of a motor or other device, for example, a pneumatic or hydraulic motor, all as disclosed in the aforementioned copending application. The mode of operation of the escapement valve and the manner in which it controls the operation of a pneumatic or hydraulic motor is disclosed in the patented art of which United States Patents Nos. 1,961,343 and 1,931,906 are examples.

Device 10 comprises a solenoid 13 within which a magnetizable armature 14, preferably one which is permanently magnetized is suspended by a knife edge 15 from a lever 16 mounted on a fulcrum 17. Movement of the lever and armature is yieldingly opposed by a spring 18 so that the armature and lever will be operated by and in accordance with the magnitude of the current traversing the solenoid. Since the escapement valve is operated by the lever, it in turn will send out pressure impulses to line 12 that vary in magnitude with the plate circuit current and cause a motor or regulator to be controlled thereby in the same fashion. This motor in turn operates or adjusts a valve or damper or a rheostat, for example, having to do with maintaining the variable under consideration at a constant value or within a predetermined range of variation. To avoid surges in the movement of the armature, a dampening element 19 may be attached to the armature and disposed in a chamber 20 formed in the lower end of a casing 21 within which the solenoid may be housed.

In order that the flow of current in the plate circuit of device 1 may be relatively smooth and not lag behind changes in the variable, a resistor 22 and condenser 23 are connected in series parallel across the instruments 8 and 9 and solenoid 13, and a resistor 24 may be connected in series with the solenoid. These resistors may be adjusted to limit the total plate current, to a desired value as well as the amount of current traversing the solenoid. Resistor 22 and condenser 23 also absorb the inductive energy of solenoid 13 when the plate circuit voltage is interrupted.

The filament 4 of glow tube 1 is supplied with alternating current from a low voltage winding 25 of an alternating current transformer 26, the primary winding of which is connected to a source of alternating current voltage. The plate circuit, as previously stated, is supplied with direct current voltage from source 7. In order that the plate circuit voltage may be periodically interrupted and the plate circuit current interrupted, an interrupting device 27 is provided. This device may be driven by an electric motor 28 of any suitable type which will operate at a reasonably constant speed: for instance the motor may be one which would operate within a range of say from 1400 to 1750 R. P. M., or within any other speed range that may be found to be suitable in any given case. The interrupting device comprises a cylindrical member 29 of conducting material which is mounted axially on shaft 30 of the motor and securely fastened thereto by means of a set screw 31 for example. This device is formed with a longitudinally extending groove 32 preferably of V shape, in which V-shaped metallic inserts 33 and 34 are disposed and anchored to the cylindrical member by means of screws 35. Member 33 is mounted in electrical conducting relationship to the cylindrical member while member 34 is insulated from the cylindrical member and V-shaped member 33 with insulation 36.

Brushes 37 and 38 are mounted to contact the surface of cylindrical member 29 and inserts 33 and 34, respectively, and are connected one to the negative terminal of the direct current voltage source 7 and the other by conductors 39 and 40 to the electrical midpoint of transformer winding 25 which supplies the filament of the grid glow tube. Thus, as member 29 rotates the direct current voltage applied to the plate circuit of device 1 is interrupted once during each revolution of the interrupter and the length of time that it is interrupted for any given speed of rotation will be equal to the time required for insert 34 to pass under or cross brush 38. For convenience, the length of the arcuate surface of insert 34 may be, for example, equal to one-eighth of the circumference of the cylindrical member 29. It will be apparent from the above that insert 33 could be integral with member 19, as it is not insulated therefrom, but it is more convenient to manufacture as shown, because only a simple operation is required to cut the V-groove 32.

During the periods that voltage is applied to the plate circuit of tube 1, the photoelectric cell 5 is momentarily energized once at some time during each "on" period, depending on the position of the light beam, and when energized, a bias voltage of such polarity and magnitude is applied to grid 3 that the critical bias voltage is exceeded, causing current to flow in the plate circuit of tube 1 from the time the breakdown bias voltage is applied until the voltage is interrupted by interrupter 27. If this breakdown bias voltage is applied at the same time that brush 38 first makes contact with the leading edge of groove 32 (assuming the interrupter to be rotating in the direction indicated by arrow 42), the current will flow in the plate circuit for the entire period or interval that the voltage is applied and will cease flowing the moment brush 38 breaks contact with the trailing edge of groove 32. By causing the breakdown bias voltage to be applied at different times in the periods that the plate circuit voltage is applied, the length of time that the glow tube passes current during such periods may be varied. Thus, the average current output of the glow tube may be varied. If the time at which the breakdown grid bias voltage is applied is varied in accordance with variations in the variable under consideration, then the current output of the glow tube will also vary in accordance with the variable.

In accordance with this invention, the current output of tube 1 is controlled by means of a screen or disc 43 having a curved slot 44 therein and which is mounted on motor shaft 30 and secured with screws 45 to interrupter 27 for rotation therewith, a source of light 46 and lens 46' through which the light shines onto a mirror 47 which is positioned to reflect a beam of light onto the screen or disc and means for shifting the mirror (and therefore the point at which the light beam strikes the screen or disc,) in accordance with the variable under consideration. If the mirror is tilted about its support 48, the reflected light beam may be caused to oscillate in a straight line path, say along radius O—X of the disc, so that as slot 44 sweeps across or through the light beam, the light beam will shine through it, impinge on the photoelectric cell and cause it to pass current which, as will soon be described, causes the grid to become positive by an amount in excess of its critical value. The mirror may be tilted by any means which will respond to changes in the variable under consideration, and if the variable is a pressure condition a bellows or flexible diaphragm may be employed as indicated at 49.

As shown in Fig. 5 slot 44 extends from a point 50 which is tangent to a circle of radius R around the disc to a point 51 which is tangent to a circle of radius R1 and these points 50 and 51 lie along radii passing through the inner and outer ends, respectively, of the slot and the leading and trailing edges of the groove in interrupter 27. Since this slot extends through such a wide angle around the disc, ribs 51' may be employed to join the portions of the disc on the opposite sides of the slot to give the disc the stiffness necessary to prevent the disc from wobbling while rotating. It will also be noted that the distances from the center of motor shaft 30, or the center of disc 43, to the slot are progressively greater from point 50 to point 51.

By giving the slot in the disc a shape corresponding to the graph characteristic of the variable being measured or controlled, the current output of the glow discharge device will have the same graph characteristic as the variable. Thus, if it is desired that there shall be a linear relation between the pressures acting on the bellows or the agency which operates the mirror, and the current output of the glow discharge device, the shape of the leading edge of slot 44 may be formed in accordance with the equation $\rho = R + (R1-R)(\theta/\phi)$ in polar coordinates; where $\rho$ is the polar radius; R is the radius of the inner circle; R1 is the radius of the outer circle; $\theta$ is the angle of progression from the origin of the slot, and $\phi$ is the total angle of progression from the origin to the end of the slot.

From the above equation it will be apparent that the relationship between the current output of device 1 and the pressure or pressures or other variable forces acting to tilt mirror 47, may be made to assume various predetermined characteristics. For example, the current may be caused to vary either as the square, cube, square root, or any other exponential function of the pressure or the variable actuating force, provided there is no point in the range of the system where two different values of the variable or quantity under consideration would produce the same value of current in the plate circuit of device 1 and these characteristics may be obtained by giving slot 44 the proper or desired shape.

Thus for each position that the light beam impinges on the screen between the limits of circles R and R1, there will be a definite but different point in the time interval during which voltage is applied to the plate circuit of tube 1 that the critical breakdown grid bias voltage is applied to grid 3 thereof; therefore, for each position of the light beam, there will be definite but different lengths of time during which tube 1 passes current while the plate circuit voltage is applied thereto.

The means for supplying the operating grid voltage to the grid of tube 1 comprises a transformer 55 having a primary winding 56 and a secondary winding 57, the opposite terminals of which are connected to plates 58 and 59 of a double-wave rectifier of the thermionic type and which includes a cathode filament 60, which is connected to a low voltage winding 61 of the transformer. The output of the rectifier is passed through a potentiometer 62 the positive terminal of which is connected by a conductor 63 to the electrical midpoint of transformer winding 61 and the negative terminal of which is connected to one terminal of a choke coil 64, the other terminal of said choke coil being connected to the electrical midpoint of transformer winding 57. The junction point between the negative terminal of the potentiometer and the choke coil and the positive terminal of the potentiometer are connected through a condenser 65. Condenser 65 and the choke coil 64 are generally referred to as a filter, the function of which is well known in this art.

The grid 3 of tube 1 is connected through resistors 66 and 67 to the negative terminal of potentiometer 62 so that under normal conditions the grid is negative. The negative bias employed is such that no current will flow in the plate circuit of tube 1, even though the plate circuit voltage is applied. The value of this bias may, for example, be 10% more than the critical value. When the photoelectric cell is energized as above described, a positive grid bias voltage is applied which both neutralizes the normal negative bias and exceeds the critical value by an amount that will cause the tube to function at the desired moment and not be affected by aging. This is accomplished by connecting the anode of the photoelectric cell to the positive terminal of the potentiometer 62 and the cathode thereof to the point of connection between resistors 66 and 67. Thus, when the photoelectric cell passes current, terminal 68 of resistor 66 is made positive by an amount sufficient to increase the positive bias voltage on the grid to a value that exceeds its critical value.

In the drawing, it will be observed that a condenser 69 is connected externally between the grid and filament of tube 1 and to ground at 70. This condenser is employed in order that a relatively low positive bias voltage may be used in operating tube 1 and causing it to break down and pass current at the desired time. If condenser 69 were not utilized, the sudden application of the plate voltage would cause the interelement capacitances of tube 1 to momentarily charge up in such a manner as to render the grid element positive.

This positive charge, of course, would leak off through the grid resistances 66 and 67, so that the bias would soon be restored to its normal negative value. This momentary positive charge would reduce the actual negative grid potential the first moment, however, with the result that a higher fixed negative bias would have to be applied to neutralize this momentary surge. By using the condenser 69 externally between the grid and filament of tube 1, this positive charge is almost completely absorbed with the result that the normal negative bias has to be raised only a few volts instead of possibly thirty to fifty volts to prevent this tube from passing current at times when the photoelectric cell is not energized.

To adjust the normal negative grid bias voltage to a value that will prevent tube 1 from passing current except when the plate circuit voltage is applied while the photoelectric cell is energized, that is illuminated, a sliding contact 71 is connected to conductors 39 and 40 which, when adjusted along potentiometer 62, will vary the normal grid bias voltage. In practice, this normal negative bias voltage is brought to the proper value, while the photoelectric cell is maintained in a deenergized condition, by adjusting this slider while the plate circuit voltage is applied, until the glow tube is just at the verge of breaking down to pass current. The negative bias is then increased a predetermined amount, say ten percent. Thus, the moment the photoelectric cell is energized, the normal negative bias is neutralized and the grid made positive by an amount which exceeds the critical grid bias voltage, thereby causing the tube to break down and pass current. By supplying a breakdown voltage to the tube which is far in excess of the critical bias voltage, aging of the grid glow tube will not affect its operation in the system.

Having thus described the invention, what I claim as new and desire to secure by Letters Patent is:

1. An electric gauge for measuring, recording and/or controlling a variable comprising a glow discharge device having plate and grid circuits, means for supplying interrupted unidirectional voltage to the plate circuit thereof, a source of voltage for the grid circuit, means for normally maintaining the grid bias at a value below the critical value thereof, means for impressing a voltage on the grid of such value and polarity that the normal grid bias is neutralized and rendered positive by an amount which exceeds the critical bias voltage and causes the device to break down and pass current in the plate circuit thereof, and means operating synchronously with said interrupted supply of plate voltage and responsive to a variable condition for controlling the time of application of said break-down bias voltage with respect to the period of duration of the plate voltage to cause the plate current of said device to vary with said condition.

2. An electric gauge for measuring, recording and/or controlling a variable comprising a glow discharge device having plate and grid circuits, a source of direct current voltage for the plate circuit, means for periodically interrupting the plate circuit voltage, thereby periodically interrupting the flow of plate current in said circuit, a source of voltage for the grid circuit adjusted to normally bias the glow discharge device to zero plate circuit current, means operative during the periods of application of said plate voltage for causing a substantially instantaneous break-down voltage to be applied to the grid circuit which will neutralize the normal bias and substantially instantly raise the grid potential above its critical value and cause current to flow in the plate circuit, and means responsive to a variable condition for said break-down voltage to be applied at different times in the periods that the plate voltage is applied to cause the plate circuit current to vary with said variable condition.

3. An electric gauge for measuring, recording and/or controlling a variable comprising a glow discharge device having plate and grid circuits, a source of direct current voltage for the plate circuit, means for periodically interrupting the plate circuit voltage and thereby periodically interrupting the flow of plate current in said circuit, a source of voltage for the grid circuit adjusted to normally bias the glow discharge device to zero plate circuit current, means for applying a breakdown voltage to the grid circuit which will neutralize the normal bias and cause current to flow in the plate circuit, and means operating in synchronism with the periodicity of the plate voltage for applying said break-down voltage to the grid circuit at different times in the on periods of the plate circuit voltage to thereby vary the plate circuit current of said device.

4. In an electric gauge adapted to measure, record and/or regulate a variable quantity, the combination with a light source, a quantity sensitive device having means associated therewith for reflecting a beam of light from said source, a photo-electric cell disposed in the path of said light beam, and a glow discharge device having plate and grid circuits, a source of negative bias voltage for the grid circuit adapted to normally bias the tube to zero plate current, and a source of bias voltage under the control of said photoelectric cell which, when said cell is illuminated causes said glow discharge device to pass current, a source of direct current voltage for the plate circuit, means for recurrently interrupting said voltage so that the plate voltage is alternatively on and off, and means associated with said light source and photo electric cell for causing the photo cell to be illuminated at different times in the "on" periods of said plate voltage depending on the value of said quantity.

5. In an electric gauge adapted for measuring, recording and/or regulating a variable quantity, the combination with quantity sensitive means, a photo-electric cell, a light source disposed to shine on said cell, means for causing the light source to impinge on said cell at definitely recurrent but different instants of time in definitely recurring time intervals, depending on the value of said quantity, quantity sensitive equipment, a glow discharge tube having a source of direct current voltage for the tube plate circuit, a source of grid voltage adjusted to normally bias the tube to zero plate current, a source of grid voltage controlled by said photo-electric cell and applied to the grid at the times at which the photo-cell is illuminated, and means for interrupting said plate-circuit voltage at the end of said recurring time intervals and reconnecting the same during such time intervals.

6. In an electric gauge adapted for measuring, recording and/or regulating a variable quantity, the combination with quantity sensitive means, a photo-electric cell, a light source disposed to shine on said cell, means for causing the light source to impinge on said cell at definitely recurrent but different instants of time in definitely recurring time intervals, depending on the value of said quantity, quantity sensitive equipment, a glow discharge tube having a source of direct current voltage for the tube plate circuit, a source of grid voltage adjusted to normally bias the tube to zero plate current, a source of direct current voltage in circuit with the photo-electric cell and said grid which is applied to the grid at the instant of time at which the photo-cell is illuminated, said photo-cell controlled voltage being of a value to substantially instantly raise the grid potential above its critical value, and means for interrupting the tube plate circuit current at the end of said recurring time intervals.

7. An electric gauge of the type adapted to measure, record and/or regulate the value of a variable quantity comprising a grid controlled glow discharge tube provided with a source of direct current voltage for the plate circuit thereof and having current responsive apparatus connected to be energized thereby, a source of grid voltage connected to the grid to render the tube normally non-conductive, a source of grid voltage which when applied substantially instantaneously renders the tube conductive, a photo-electric cell connected in circuit with said second source of grid voltage for controlling the application thereof to the grid, a source of light disposed to shine on the photo-cell and cause it to connect the grid to the voltage which renders the tube conductive, a moving screen disposed to sweep through the light beam and provided with a curved opening extending at an angle to the line of movement of the screen at the point where the light beam impinges on the screen, means responsive to changes in said quantity for causing the light beam to shine through the opening at points between the ends thereof to thereby cause the photo-electric cell to be energized at relatively different instants of time for different values of said quantity, and means for connecting said source of direct current voltage to the plate for the period of time required for the opening to sweep through the plane of the light beam, interrupting said voltage when the trailing extremity of the opening has passed by the light beam and then reconnecting the voltage to the plate circuit when the leading end of said opening approaches the light beam.

8. The method of controlling the value of current in the plate circuit of a grid controlled glow discharge tube which becomes conducting upon the grid receiving a potential above the critical value of the tube and remains conducting until the plate circuit current is interrupted, which consists in applying unidirectional voltage to the plate circuit of the tube, periodically interrupting said plate circuit voltage, providing a source of grid voltage having a value exceeding the critical value, and applying said voltage only when the plate circuit voltage is applied, and varying the time that said grid voltage is applied in accordance with the value of plate current desired.

9. The method of controlling the plate circuit current output of a grid controlled glow discharge tube, which consists in providing a supply of grid potential having a magnitude exceeding the critical grid potential, applying uni-directional current voltage to the plate circuit of the tube, periodically interrupting said plate voltage, applying said grid voltage only when the plate voltage is uninterrupted, and varying the instants of time in the uninterrupted periods of said plate voltage that said grid voltage is applied in accordance with the value of plate current desired.

10. Apparatus for controlling the current output of a grid controlled glow discharge tube comprising a source of direct current for the tube plate circuit, means for interrupting said voltage periodically, a source of grid voltage having a value exceeding the critical value of the tube, a photo-electric cell in circuit with said grid voltage, means for shining a beam of light on said photo-electric cell to energize the same, and means for causing said light beam to energize the photo-electric cell only during the uninterrupted periods of the plate voltage and at different times in such periods to thereby control the value of current in the plate circuit of said tube.

11. Apparatus for controlling the current output of a grid controlled glow discharge tube comprising a source of direct current for the tube plate circuit, means for interrupting said voltage periodically, a source of grid voltage having a value exceeding the critical value of the tube, a photo-electric cell in circuit with said grid voltage, means for shining a beam of light on said photo-electric cell to energize the same, a rotating screen disposed between the light source and photo-electric cell and having a polar slot therein which extends through such an angle that the slot sweeps past the light source during each uninterrupted period of the plate voltage, and means for causing said light beam to move radially of the disc and thereby cause the photo-electric cell to be energized at different times during said uninterrupted plate voltage periods and thereby cause the plate current to vary with each radial position of the light beam.

12. In an electric gauge adapted to measure, record, and/or regulate a variable quantity, the combination with a quantity sensitive device having means associated therewith for projecting a beam of light, a photo-electric cell disposed in the path of said light beam, a glow discharge device having plate and grid circuits, a source of grid voltage under the control of said photo-electric cell, a source of direct current voltage for the plate circuit, means for recurrently interrupting said voltage so that the plate voltage is alternately on and off, and means associated with said light source and photo-electric cell for causing the photo-electric cell to apply the control grid voltage at such times in the on periods of the plate voltage that the current output of said discharge device is made to depend upon the value of said variable quantity.

JAMES E. SPECHT.